United States Patent [19]
Lienhard et al.

[11] 4,263,197
[45] Apr. 21, 1981

[54] PROCESS FOR DYEING LINEAR POLYAMIDES IN THE MELT

[75] Inventors: Paul Lienhard, Frenkendorf; Abul Iqbal, Ettingen; Heinz Peter, Rheinfelden, all of Switzerland

[73] Assignee: Ciba-Geigy Corporation, Ardsley, N.Y.

[21] Appl. No.: 79,292

[22] Filed: Sep. 27, 1979

Related U.S. Application Data

[63] Continuation of Ser. No. 916,623, Jun. 19, 1978, abandoned.

[30] Foreign Application Priority Data

Jun. 23, 1977 [CH] Switzerland ................ 7722/77

[51] Int. Cl.³ .............................................. C08L 77/00
[52] U.S. Cl. ...................................... 260/37 N; 8/516
[58] Field of Search .................... 260/37 N; 8/4, 42 B

[56] References Cited

U.S. PATENT DOCUMENTS 3,406,162 10/1968 Neier ............................................ 8/4
3,878,158 4/1975 Brouard et al. .................... 260/37 N

FOREIGN PATENT DOCUMENTS 49-27229 3/1974 Japan .
944409 12/1963 United Kingdom .

Primary Examiner—Lewis T. Jacobs
Attorney, Agent, or Firm—Luther A. R. Hall

[57] ABSTRACT

A process for dyeing linear polyamides in the melt, in which process there are used salts from 1:2 chromium complexes of monoazo dyes and amines containing 1–18 C atoms.

12 Claims, No Drawings

PROCESS FOR DYEING LINEAR POLYAMIDES IN THE MELT

This is a continuation of application Ser. No. 916,623, filed on June 19, 1978, now abandoned.

It is known that for the melt dyeing of synthetic polyamides it is possible to use the alkali metal salts of monoazo dyes (see, for example, British Pat. Nos. 1,021,737 and 1,264,191, and French Pat. No. 1,547,128). These have however the disadvantage that, contaminated with inorganic salts, they produce residues insoluble in polymers, and these residues lead to a severe coating of the screening or filtering plants and render necessary a large expenditure for cleaning operations. The dyeing substances isolated as alkali metal salts frequently persistently retain water, or again absorb water during storage after drying at high temperature, which can result in polymer degradation during the spinning process or to corrosion in the spinning machine.

It has now been found that these disadvantages can be avoided by using, for the dyeing of linear polyamides in the melt, salts of 1:2 chromium complexes of monoazo dyes with amines containing 1–18 C atoms. Dye salts of this type contain a considerably smaller amount of inorganic salts and water and are also less hygroscopic. Furthermore, they can be isolated, after synthesis of the colouring substance, in a particularly simple and complete manner.

The dyes to be used correspond preferably to the formula

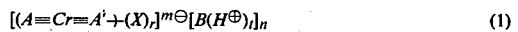

wherein

A, A' represent identical or different radicals of ato dyes, which radicals are bound to the Cr atom after 2 protons have been split off by the formation of 2 rings, X represents a —COO or —SO$_3$ group not bound to the Cr atom, B represents a mono- di- or triamine having 1–18 C atoms, m and t represent the numbers 1–3, r=m−1, and n=m/t.

Preferred dyes are those of the formula

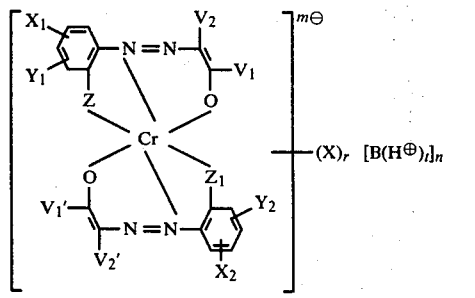

wherein

B, X, r, m, t and n have the meanings given above, $X_1$ and $X_2$ represent H atoms, alkyl, alkoxy or alkylsulphonyl groups having 1–6 C atoms, alkanoylamino groups having 2–6 C atoms, or groups of the formula SO$_2$NRR' in which R represents an H atom, an alkyl group having 1–6 C atoms, a hydroxyalkyl group having 2–6 C atoms, an alkoxyalkyl group having 3–8 C atoms, or a phenyl group optionally substituted by halogen atoms or by alkyl groups having 1–4 C atoms, R' represents an H atom, an alkyl group having 1–6 C atoms, or a hydroxyalkyl group having 2–6 C atoms, $Y_1$ and $Y_2$ represent H atoms or halogen atoms, or alkyl groups having 1–6 C atoms, or wherein $X_1$ and $Y_1$ or $X_2$ and $Y_2$ together form a fused-on benzene ring, Z and $Z_1$ represent an O atom or a —COO group, and the radicals

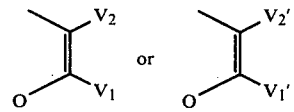

represent the groups

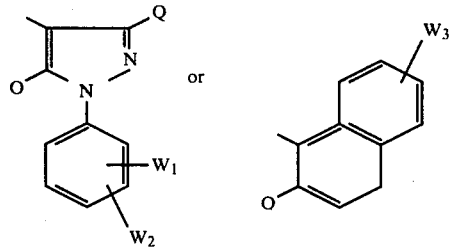

wherein

Q represents a methyl or carbamoyl group or an alkoxycarbonyl group having 2–6 C atoms, $W_1$ represents an H or halogen atom, or a methyl or sulphamoyl group, $W_2$ represents an H atom, or an alkanoylamino group having 2–6 C atoms.

Dyes particularly preferred are those of the formula (2) wherein $X_1=X_2$, $Y_1=Y_2$ and $Z=Z_1$, and the radicals

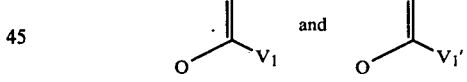

represent the radical of the formula

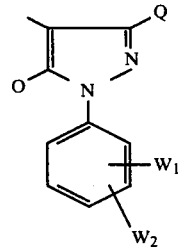

wherein Q, $W_1$ and $W_2$ have the meanings given.

The dye to be used are advantageously free from sulphonic acid groups and from free carboxyl groups, i.e. carboxyl groups not bound in complex linkage.

The metal complexes of the formulae (1) and (2) contain as cation B (H+)$_t$ preferably one of the formula

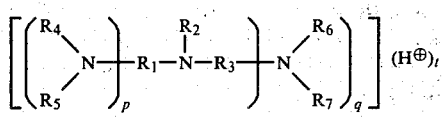

wherein $R_1$ represents an alkyl or alkylene group having 1 to 18 C atoms, a cycloalkyl or cycloalkylene group having 5 to 6 C atoms, or a phenyl or phenylene group optionally substituted by halogen atoms or by alkyl groups having 1 to 6 C atoms, $R_3$ represents an H atom, an alkyl or alkylene group having 1 to 18 C atoms, or a cycloalkyl group having 5 to 6 C atoms, $R_2$, $R_4$, $R_5$, $R_6$ and $R_7$ represent H atoms, alkyl groups having 1 to 8 C atoms, or cycloalkyl groups having 5 to 6 C atoms, p and q represent 0 or 1, where q=0 if $R_3$ represents an H atom and $t = p + q + 1$.

On account of the high softening point, the good thermostability and the high colouring strength of their dye salts, symmetrical cations $B(H^+)_t$ of the following formula

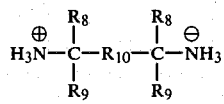

wherein $R_8$ represents an H atom, or an alkyl group having 1 to 4 C atoms, $R_9$ represents the same as $R_8$, or represents a cyclopentyl, cyclohexyl or phenyl group, and $R_{10}$ represents a straight-chain or branched-chain alkylene group having 1 to 18 C atoms, are particularly suitable.

As examples of monoamines, there may be mentioned: methylamine, trimethylamine, ethylamine, diethylamine, triethylamine, propylamine, isopropylamine, 2-isopropoxy-n-propylamine, n-butylamine, isobutylamine, ethyl-n-butylamine, tri-(n-butyl)-amine, pentylamine, n-hexylamine, tri-(2-ethylhexyl)-amine, cyclohexylamine, N-methylcyclohexylamine, dicyclohexylamine, benzylamine, aniline, m-chloroaniline, mesitylamine, o-anisidine, N-ethylaniline, p-toluidine, octylamine, n-decylamine, ω-aminoundecanoic acid, n-dodecylamine or stearylamine.

Preferred are diamines such as N,N-dibutylethylenediamine, N-β-hydroxyethyl-ethylenediamine, p-phenylenediamine and N-ethylpropylenediamine, especially however symmetrically formed alkylenediamines having 2 to 18 C atoms, for example ethylene-, propylene-, tetramethylene-, pentamethylene- or hexamethylenediamine, 1,12-diaminododecane, 2,11-diaminododecane, 3,12-diaminotetradecane, 2,11-diamino-2,11-dimethyldodecane, 4,13-diamino-3,14-dimethyl-hexadecane, 4,13-diaminohexadecane, 3,12-diamino-2,13-dimethyl-tetradecane, 5,14-diaminooctadecane and 4,13-diamino-2,15-dimethylhexadecane.

Diethylene-triamine may be mentioned as an example of a triamine, and piperazine as an example of heterocyclic amine.

Suitable linear polyamides for the present process are polyamides such as can be produced for example from ε-caprolactam ("Perlon", Nylon 6), from ω-aminoundecanoic acid ("Rilsan"), from hexamethylenediamine and adipic acid ("Nylon" 6.6), or from analogous starting materials. Also suitable are copolyamides, for example those from ε-caprolactam and hexamethylenediamine and adipic acid.

The dyes are mixed by known processes, in solid or liquid form or as a solution, with the polyamide, and the mixture obtained is optionally intermediately dried.

The polyamides to be dyed are preferably sprinkled, in the form of powders, granules or chips, with the dry dye powder, i.e. mechanically mixed together in such a manner that the surface of the particles becomes coated with a layer of the dye. The dye is advantageously in a finely divided form.

Instead of using the pure dyes, it is in many cases of advantage to use preparations containing, in addition of the dye, a carrier substance, preferably a Ca or Mg salt of a higher fatty acid, for example of stearic or behenic acid.

The polyamide particles containing the dye or dye preparation are melted and spun by known processes, or shaped in some other manner, for example they are processed into the form of sheets or films, or moulded articles, such as injection-moulded parts.

The dye or the dye preparation can also be introduced, in the solid or liquid form, into the melted polyamide, and this can be subsequently spun or moulded.

There are obtained uniformly dyed objects which are characterised by a high degree of fastness to light, wet processing, rubbing and thermofixing.

The dyes are evenly and finely dispersed in the dyed material. Although their solubility in organic solvents, such as chlorinated hydrocarbons, lower ketones, esters and alcohols, is not high, they are frequently in the dissolved form in the polyamide.

The dyed objects advantageously contain 0.01 to 3% of dye.

It is surprising that the amine salts according to the invention, as salts of strong acids and weak bases, stand up to the high temperatures of the melting process without undergoing any significant decomposition, and that they do not noticeably impair the textile properties of the fibres.

EXAMPLE 1

A solution of 5.8 g (0.05 mol) of hexamethylenediamine in 100 ml of water and 5.5 g of formic acid (0.12 mol) is added dropwise, in the course of 15 minutes, to a well stirred suspension of 84.38 g (0.1 mol) of the sodium salt of the 1:2 chromium complex of the azo dye 2-amino-5-ethylsulphonylphenol→1-phenyl-3-methyl-5-pyrazolone in 1300 ml of water at 90°–95° C. The mixture is allowed to fully react for 1 hour at 90°–95° C. with stirring, and is then filtered under a slight vacuum. The filter residue is successively washed with 600 ml of a 1% formic acid solution and 600 ml of water. The product dried in vacuo (110°–115° C.) weighs 87.8 g; it has a content of dye salt of 97.1%, and contains only 0.25% of NaCl and 1% of water.

By spinning in polycaprolactam is obtained a red fibre material which has very good fastness to light, wet processing, thermofixing and rubbing.

EXAMPLE 2

A solution of 1.16 g (0.01 mol) of hexamethylenediamine in 50 ml of ethanol and 1.1 g (0.024 mol) of formic acid is added dropwise, within 30 minutes, to a solution (at 70° C.) of 16.87 g (0.02 mol) of the sodium salt of the 1:2 chromium complex of the azo dye 2-amino-5-ethyl-sulphonyl-phenol→1-phenyl-3-methyl-5-pyrazolone in 250 ml of ethanol. The reaction mixture is allowed to cool to room temperature, and is stirred for a further 3 hours; the precipitate occurring in crystalline form is filtered off, washed with 50 ml of ethanol and subsequently dried in a vacuum oven at 110°–115° C. to yield 16.7 g of dye salt.

EXAMPLE 3

16.87 g (0.02 mol) of the sodium salt of the 1:2 chromium complex of the azo dye 2-amino-5-ethylsulphonyl-phenol→1-phenyl-3-methyl-5-pyrazolone is suspended in 250 ml of n-butanol and heated to 90°–95° C., whereupon the dye partially goes into solution. There is subsequently added dropwise, in the course of 30 minutes, a solution of 1.16 g (0.01 mol) of hexamethylenediamine in 50 ml of water and 1.1 g (0.024 mol) of formic acid. The reaction mixture is allowed to cool to room temperature, and is stirred for a further 3 hours at this temperature, during which time the dye salt precipitates in crystalline form. The residue is filtered off, washed with 50 ml of n-butanol, and dried in a vacuum oven at 110°–115° C. to yield 14.4 g of dye salt.

EXAMPLE 4

The suspension of 13.19 g (0.02 mol) of the sodium salt of the 1:2 chromium complex of the azo dye 2-aminophenol→1-phenyl-3-methyl-5-pyrazolone in 250 ml of water is heated to 90°–95° C. and well stirred for 1 hour at this temperature. A solution of 1.16 g (0.01 mol) of hexamethylenediamine in 50 ml of water and 0.9 ml (0.024 mol) of formic acid is added dropwise within 15 minutes, and the reaction mixture is allowed to fully react, with stirring, for 1 hour at 90°–95° C. It is then filtered, and the residue is successively washed with 125 ml of a 1% formic acid solution and with 125 ml of water. It is dried in a vacuum oven at 110°–115° C. to yield 12.9 g of dye salt; it contains 0.039% of NaCl and 4.3% of $H_2O$.

By spinning in polycaprolactam is obtained a scarlet-red fibre material which has very good fastness to light, wet processing, thermofixing and rubbing.

EXAMPLE 5

16.87 g (0.02 mol) of the pulverulent sodium salt of the 1:2 chromium complex of the azo dye 2-amino-5-ethylsulphonylphenol→1-phenyl-3-methyl-5-pyrazolone is sprinkled, within 30 minutes, into a solution (at 90°–95° C.) of 1.16 g (0.01 mol) of hexamethylenediamine in 300 ml of water and 1.10 g (0.024 mol) of formic acid. The resulting suspension is stirred for a further one hour at 90°–95° C., and is then filtered under a slight vacuum; the residue is washed with 150 ml of a 1% formic acid solution and with 150 ml of water, and subsequently dried in vacuo at 110°–115° C. The yield of dye salt is 17.2 g. It contains 0.071% of NaCl and 1.85% of water.

EXAMPLE 6

To a solution (at 90°–95° C.) of 1.16 g (0.01 mol) of hexamethylenediamine in 50 ml of $H_2O$ and 1.1 g (0.024 mol) of formic acid is added dropwise, within 30 minutes, a suspension (at 90° C.) of 16.87 g (0.02 mol) of the sodium salt of the 1:2 chromium complex of the azo dye 2-amino-5-ethylsulphonyl-phenol→1-phenyl-3-methyl-5-pyrazolone in 200 ml of water. The dropping funnel is rinsed with about 20 ml of water, and the reaction mixture is allowed to fully react, with stirring, for a further 1 hour at 90°–95° C. The dye which has precipitated is filtered off, successively washed with 150 ml of a 1% formic acid solution and with 150 ml of water, and finally dried at 110°–115° C. to yield 17.2 g of dye salt; this contains 0.057% of NaCl and 1.4% of $H_2O$.

EXAMPLE 7

A solution of 3.48 g (0.03 mol) of hexamethylenediamine in 200 ml of water and 3.3 g (0.072 mol) of formic acid is added dropwise, within 40 minutes, to a solution (at 90°–95° C.) of 18.39 g (0.02 mol) of the sodium salt of the 1:2 chromium complex of the azo dye 3-hydroxy-4-aminonaphthalene-sulphonic acid→1-phenyl-3-methyl-5-pyrazolone in 250 ml of n-butanol. The reaction mixture is allowed to cool to room temperature, with the major part of the dye salt precipitating in crystalline form. The product which has separated out is filtered off, washed with 300 ml of water and dried in a vacuum oven at 110°–115° C. The butanolic filtrate is extracted twice with 100 ml of water each time, and subsequently completely concentrated by evaporation in a rotating flask. In this manner is obtained a further (smaller) amount of product, which is likewise dried in vacuo at 110°–115° C. The total yield of dye salt is 20.9 g. It contains 0.1% of sodium chloride.

By spinning in polycaprolactam is obtained a bluish-red fibre material which has very good fastness to light, wet processing, thermofixing and rubbing.

EXAMPLE 8

18.14 g (0.02 mol) of the sodium salt of the 1:2 chromium complex of the azo dyes 2-aminophenol-4-sulphomethylamide→1-phenyl-3-methyl-5-pyrazolone and 2-amino-4-methylaminosulphonyl-phenol→1-acetamido-7-naphthol is suspended in 250 ml of water, and the suspension is stirred for 60 minutes at 90°–95° C., in which time the dye goes completely into solution. There is now added dropwise, within 15 minutes, a solution of 1.16 g (0.01 mol) of hexamethylenediamine in 50 ml of water and 1.1 g (0.024 mol) of formic acid, and the reaction mixture is allowed to fully react, with stirring, for 1 hour at 90°–95° C. The dye salt which has precipitated in crystalline form is filtered off under a slight vacuum; it is successively washed with 125 ml of a 1% formic acid solution and with 125 ml of water, and subsequently dried in vacuo at 110°–115° C. There is thus obtained 12.9 g of dye salt containing 0.039% of sodium chloride and 4.3% of water.

Spinning in polycaprolactam results in a brown fibre material which has very good fastness to light, wet processing, thermofixing and rubbing.

EXAMPLE 9

A solution of 3.62 g (0.02 mol) of dicyclohexylamine in 50 ml of $H_2O$, 5 ml of ethanol and 1.1 g (0.024 mol) of formic acid is added dropwise, within 20 minutes, to a solution (at 90°–95° C.) of 14.56 g (0.02 mol) of the sodium salt of the 1:2 chromium complex of the azo dye 2-amino-4-chlorophenol→1-phenyl-3-methyl-5-pyrazolone in 250 ml of n-butanol. The reaction mixture is allowed to cool to room temperature, with some amine salt precipitating in a fine-crystalline form. After filtration and subsequent washing of the filtrer residue with a small amount of solvent, the butanol solution is extracted three times with 100 ml of $H_2O$ each time, and then concentrated to dryness in a rotating flask. The residue obtained and also the suction-filter residue mentioned above are dried in a vacuum oven at 110°–115° C. to yield a total amount of 17.3 g of dye salt containing 0.1% of NaCl and 1–2.3% of $H_2O$.

The result of spinning in polycaprolactam is a red fibre material which has very good fastness to light, wet processing, thermofixing and rubbing.

EXAMPLE 10

A mixture of 2.0 g (0.01 mol) of 1,12-diaminododecane in 100 ml of water and 1.1 g (0.024 mol) of formic acid is added dropwise, within 20 minutes, to a solution (at 90°–95° C.) of 16.87 g (0.02 mol) of the sodium salt of the 1:2 chromium complex of the azo dye 2-amino-5-ethylsulphonyl-phenol→1-phenyl-3-methyl-5-pyrazolone in 500 ml of n-butanol. The reaction mixture is allowed to fully react for 1 hour at 90°–95° C., and to subsequently cool to room temperature. The organic phase is separated, extracted three times with 125 ml of water each time, and finally evaporated to dryness in a rotating flask (bath temperature=max. 90° C.). The residue, dried in vacuo at 110°–115° C., weighs 10.7 g and contains only 0.044% of NaCl and 0.69% of water.

EXAMPLE 11

2 g of the dye salt produced according to Example 4 and approximately 10 g of acetone are stirred with 98 g of polyhexamethyleneadipamide in the form of chips, until a uniform coating of the red dye salt is formed on the surface of the chips. The chips are dried, and then melted, and spun in a customary apparatus; there are thus obtained filaments in a scarlet-red shade, which have excellent fastness to water, rubbing, dry-cleaning and light.

EXAMPLES 12–91

If there is reacted the number of mols of one of the homogeneous or mixed sodium salts listed in column II of the Tables 1–6 with the number of mols of an amine given in column III of the stated Tables, by any one of the processes described in Examples 1–10, there are likewise obtained valuable colouring substances of high purity. By dusting these onto polamide (PA 6) and by spin-dyeing are obtained fibres of which the shade is given in column IV of the Tables.

TABLE 1

| I Ex. No. | Mol | II Sodium salt of the 1:2 chromium complex | Mol | III Amine | IV Shade in PA 6 |
|---|---|---|---|---|---|
| 12 | 1 | 2-amino-5-ethylsulphonyl-phenol → 1-phenyl-3-methyl-5-pyrazolone | ½ | propylenediamine | red |
| 13 | 1 | 2-amino-5-ethylsulphonyl-phenol → 1-phenyl-3-methyl-5-pyrazolone | 1 | benzylamine | red |
| 14 | 1 | 2-amino-5-ethylsulphonyl-phenol → 1-phenyl-3-methyl-5-pyrazolone | 1 | aniline | red |
| 15 | 1 | 2-amino-5-ethylsulphonyl-phenol → 1-phenyl-3-methyl-5-pyrazolone | ½ | ethylenediamine | red |
| 16 | 1 | 2-amino-5-ethylsulphonyl-phenol → 1-phenyl-3-methyl-5-pyrazolone | 1 | stearylamine | red |
| 17 | 1 | 2-amino-5-ethylsulphonyl-phenol → 1-phenyl-3-methyl-5-pyrazolone | ½ | N-(2-hydroxyethyl)ethylenediamine | red |
| 18 | 1 | 2-amino-5-ethylsulphonyl-phenol → 1-phenyl-3-methyl-5-pyrazolone | 1 | ethylamine | red |
| 19 | 1 | 2-amino-5-ethylsulphonyl-phenol → 1-phenyl-3-methyl-5-pyrazolone | 1 | diethylamine | red |
| 20 | 1 | 2-amino-5-ethylsulphonyl-phenol → 1-phenyl-3-methyl-5-pyrazolone | ½ | N,N-(dimethyl)-ethylenediamine | red |
| 21 | 1 | 2-amino-5-ethylsulphonyl-phenol → 1-phenyl-3-methyl-5-pyrazolone | ½ | piperazine | red |
| 22 | 1 | 2-amino-5-ethylsulphonyl-phenol → 1-phenyl-3-methyl-5-pyrazolone | ½ | diethylenetriamine | red |
| 23 | 1 | 2-amino-4-chlorophenol-5-sulphamide → 1-phenyl-3-methyl-5-pyrazolone | ½ | hexamethylene diamine | red |
| 24 | 1 | 2-amino-4-chlorophenol-5-sulphamide → 1-phenyl-3-methyl-5-pyrazolone | 1 | 2-methoxyethyl-amine | red |
| 25 | 1 | 2-aminophenol-4-sulphamide → 1-(3'-chlorophenyl)-3-methyl-5-pyrazolone | ½ | hexamethylene-diamine | orange |
| 26 | 1 | 2-aminophenol-4-sulphamide → 1-(3'-chlorophenyl)-3-methyl-5-pyrazolone | 1 | stearylamine | orange |
| 27 | 1 | 2-aminophenol-4-sulph-N,N-diethyl-amide → 1-phenyl-3-methyl-5-pyrazolone | ½ | hexamethylene-diamine | orange |
| 28 | 1 | 2-aminophenol-4-sulph-N,N-bis-(2'-hydroxyethyl)-amide → 1-phenyl-3-methyl-5-pyrazolone | ½ | hexamethylene-diamine | orange |
| 29 | 1 | 2-amino-4-methylsulphonyl-phenol → 1-(3'-chlorophenyl)-3-methyl-5-pyrazolone | ½ | diethylene-triamine | orange |
| 30 | 1 | 2-amino-4-methylsulphonyl-phenol → 1-(3'-chlorophenyl)-3-methyl-5-pyrazolone | ½ | hexamethylene-diamine | orange |
| 31 | 1 | 2-aminophenol-4-sulph-(2'-methoxyethyl)-amide → 1-phenyl-3-methyl-5-pyrazolone | 1 | triethylamine | orange |
| 32 | 1 | 2-aminophenol-4-sulph-(2'-methoxyethyl)-amide → 1-phenyl-3-methyl-5-pyrazolone | ½ | hexamethylene-diamine | orange |
| 33 | 1 | 2-amino-5-ethylsulphonyl-phenol → 1-phenyl-3-methyl-5-pyrazolone | ½ | p-phenylene-diamine | red |

TABLE 1-continued

| I Ex. No. | Mol | II Sodium salt of the 1:2 chromium complex | Mol | III Amine | IV Shade in PA 6 |
|---|---|---|---|---|---|
| 34 | 1 | 2-amino-5-ethylsulphonyl-phenol → 1-phenyl-3-methyl-5-pyrazolone | ½ | 1,12-diamino-dodecane | red |

TABLE 2

| I Ex. No. | Mol | II Sodium salt of the 1:2 chromium complex | Mol | III Amine | IV Shade in PA 6 |
|---|---|---|---|---|---|
| 35 | 1 | 2-aminophenol-4-sulph-N-(2'-carboxy-phenyl)-amide → 1-phenyl-3-methyl-5-pyrazolone | 1½ | hexamethylene-diamine | orange |
| 36 | 1 | 2-aminophenol-4-sulph-N-(2'-carboxy-phenyl)-amide → 1-phenyl-3-methyl 5-pyrazolone | 3 | tri-n-butylamine | orange |
| 37 | 1 | 1-amino-2-naphthol-4-sulphonic acid 1-phenyl-3-methyl-5-pyrazolone | 3 | triethylamine | bluish-red |
| 38 | 1 | 1-amino-2-naphthol-4-sulphonic acid 1-phenyl-3-methyl-5-pyrazolone | 3 | ethylbutylamine | bluish-red |
| 39 | 1 | 2-amino-4-chlorophenol → 1-(4'- | 1½ | hexamethylene-diamine | red |
| 40 | 1 | 2-amino-4-chlorophenol → 1-(4'- | 3 | tri-(2-ethyl-hexyl)-amine | red |

TABLE 3

| I Ex. No. | Mol | II Sodium salt of the 1:2 chromium complex | Mol | III Amine | IV Shade in PA 6 |
|---|---|---|---|---|---|
| 41 | 1 | 2-aminophenol → 1-phenyl-3-methyl-5-pyrazolone | ½ | ethylenediamine | scarlet |
| 42 | 1 | 2-aminophenol → 1-phenyl-3-methyl-5-pyrazolone | ½ | N,N-di-(n-butyl)-ethylenediamine | scarlet |
| 43 | 1 | 2-amino-5-nitrophenol → 1-phenyl-3-methyl-5-pyrazolone | ½ | hexamethylene-diamine | red |
| 44 | 1 | 2-amino-4-chlorophenol → 1-(4'-chlorophenyl)-5-pyrazolone-3-carboxylic acid ethyl ester | ½ | hexamethylene-diamine | red |
| 45 | 1 | 2-amino-4-chlorophenol → 1-phenyl-5-pyrazolone-3-carboxylic acid amide | ½ | hexamethylene-diamine | red |
| 46 | 1 | 2-amino-4-chlorophenol → 2-naphthol | 1 | n-octylamine | violet |
| 47 | 1 | 2-amino-4-chlorophenol → 2-naphthol | 1 | N-(2-aminoethyl)-pyrrolidone | violet |
| 48 | 1 | 2-amino-4-chlorophenol → 2-naphthol | 1 | diethylamine | violet |
| 49 | 1 | 2-amino-4-chlorophenol → 1-phenyl-3-methyl-5-pyrazolone | ½ | hexamethylene-diamine | red |
| 50 | 1 | 2-amino-4-chlorophenol → 1-phenyl-3-methyl-5-pyrazolone | 1 | trimethylamine | red |
| 51 | 1 | 2-amino-4,6-dichlorophenol → 1-phenyl-3-methyl-5-pyrazolone | 1 | aminoundecanoic acid | red |
| 52 | 1 | 2-amino-4,6-dichlorophenol → 1-phenyl-3-methyl-5-pyrazolone | ½ | N-ethyl-propylene-diamine | red |
| 53 | 1 | 2-amino-4-chlorophenol → 1-phenyl-3-methyl-5-pyrazolone | 1 | 2-isopropoxy-ethylamine | red |
| 54 | 1 | 2-amino-4-chlorophenol → 1-phenyl-3-methyl-5-pyrazolone | 178 | N-(2-hydroxyethyl)-ethylenediamine | red |
| 55 | 1 | 2-amino-4-chlorophenol → 1-phenyl-3-methyl-5-pyrazolone | 1 | trimethylamine | red |
| 56 | 1 | 2,5-dimethoxyaniline → 1-phenyl-3-methyl-5-pyrazolone (demethylated and chromed) | ½ | hexamethylene-diamine | claret shade |

TABLE 4

| Ex. No. | Mol | Sodium salt of the 1:2 chromium complex | Mol | Amine | Shade in PA 6 |
|---|---|---|---|---|---|
| 57 | 1 | anthranilic acid → 1-phenyl-3-methyl-5-pyrazolone | ½ | hexamethylene-diamine | yellow |
| 58 | 1 | anthranilic acid → 1-phenyl-3-methyl-5-pyrazolone | 1 | n-dodecylamine | yellow |
| 59 | 1 | anthranilic acid → 1-(2'-chlorophenyl)-3-methyl-5-pyrazolone | ½ | hexamethylene-diamine | yellow |
| 60 | 1 | anthranilic acid → 1-(2'-chlorophenyl)-3-methyl-5-pyrazolone | 1 | n-octylamine | yellow |
| 61 | 1 | anthranilic acid → 1-(2'-ethyl- | ½ | ethylenediamine | yellow |

TABLE 4-continued

| Ex. No. | Mol | Sodium salt of the 1:2 chromium complex | Mol | Amine | Shade in PA 6 |
|---|---|---|---|---|---|
| 62 | 1 | anthranilic acid → 1-(2'-ethyl-phenyl)-3-methyl-5-pyrazolone | ½ | methyl-di-(3-aminopropyl)-amine | yellow |
| 63 | 1 | anthranilic acid → 1-(2',5'-dichlorophenyl)-3-methyl-5-pyrazolone | ¼ | N,N'-di-(3-amino-propyl)-ethylene-diamine | yellow |
| 64 | 1 | anthranilic acid → 1-(2',5'-dichlorophenyl)-3-methyl-5-pyrazolone | ½ | hexamethylene-diamine | yellow |
| 65 | 1 | 2-amino-5-chlorobenzoic acid → 1-phenyl-3-methyl-5-pyrazolone | 1 | N-methylcyclo-hexylamine | yellow |
| 66 | 1 | 2-amino-5-chlorobenzoic acid → 1-phenyl-3-methyl-5-pyrazolone | 1 | p-toluidine | yellow |
| 67 | 1 | anthranilic acid → 1-phenyl-3-methyl-5-pyrazolone-3'-sulphamide | ½ | hexamethylene-diamine | yellow |

TABLE 5

| I | II | | III | IV |
|---|---|---|---|---|
| Ex. No. | Sodium salt of the 1:2 chromium complex | | | Shade on |
| | Mol | X + Y | Mol Amine | PA 6 |
| 68 | 1 | 2-aminophenol-4-sulph-amide → 1-(3'-chloro-phenyl)-3-methyl-5-pyrazolone | 2-aminophenol-4-sulph-amide → 2-naphthol | ½ hexamethylene-diamine | claret shade |
| 69 | 1 | 2-aminophenol-4-sulph-amide → 1-(3'-chloro-phenyl)-3-methyl-5-pyrazolone | 2-aminophenol-4-sulph-amide → 2-naphthol | 1 cyclohexylamine | claret shade |
| 70 | 1 | 2-aminophenol-4-sulph-isopropylamide → 1-phenyl-3-methyl-5-pyrazolone | 2-aminophenol-4-sulph-isopropylamide → 1-naphthol | 1 N-ethylaniline | claret shade |
| 71 | 1 | 2-aminophenol-4-sulph-isopropylamide → 1-phenyl-3-methyl-5-pyrazolone | 2-aminophenol-4-sulph-isopropylamide → 1-naphthol | ½ hexamethylene-diamine | claret shade |
| 72 | 1 | 2-aminophenol-4-sulph-amide → 1-(3'-chloro-phenyl)-3-methyl-5-pyrazolone | 2-aminophenol-4-sulph-amide → 1-(carbometh-oxaamino)-7-naphthol | 1 m-chloroaniline | brown |
| 73 | 1 | 2-aminophenol-4-sulph-amide → (3'-chloro-phenyl)-3-methyl-5-pyrazolone | 2-aminophenol-4-sulph-amide → 1-(carbometh-oxaamino)-7-naphthol | 1 mesitylamine | brown |
| 74 | 1 | 2-aminophenol-4-sulph-methylamide → 1-(4'-chlorophenyl)-3-methyl-5-pyrazolone | 2-aminophenol-4-sulph-methylamide → 1-acet-amido-7-naphthol | 1 o-anisidine | brown |
| 75 | | 2-aminophenol-4-sulph-methylamide → 1-(4'-chlorophenyl)-3-methyl-5-pyrazolone | 2-aminophenol-4-sulph-methylamide → 1-acet-amido-7-naphthol | 1 di-(2-ethyl-hexyl)-amine | brown |

TABLE 6

| I | II | | III | IV |
|---|---|---|---|---|
| Ex. No. | Sodium salt of the 1:2 chromium complex | | | Shade in |
| | Mol | X + Y | Mol Amine | PA 6 |
| 76 | 1 | 2-amino-4-methyl-phenol → 1-phenyl-3-methyl-5-pyrazolone | 2-aminophenol-4-sulph-onic acid → 1-phenyl-3-methyl-5-pyrazolone | 1 hexamethylene-diamine | red |
| 77 | 1 | 2-amino-4-chloro-phenol → 1-phenyl-3-methyl-5-pyrazolone | 2-amino-4-methyl-phenol → 1-(4'-sulphophenyl)-3-methyl-5-pyrazolone | 1 hexamethylene-diamine | red |
| 78 | 1 | 2-amino-4,6-dichloro-phenol → 1-phenyl-3-methyl-5-pyrazolone | 2-amino-4-chlorophenol → 1-(4'-sulphophenyl)-3-methyl-5-pyrazolone | 1 ethylenediamine | red |
| 79 | 1 | 2-amino-4-methyl-phenol → 1-phenyl-3-methyl-5-pyrazolone | 2-amino-4-methyl-phenol → 1-(4'-sulphophenyl)-3-methyl-5-pyrazolone | 1 ethylenediamine | red |
| 80 | 1 | 2-amino-4-chloro-phenol → 1-phenyl-3-methyl-5-pyrazolone | 1-amino-2-naphthol-4-sulphonic acid → 1-phenyl-3-methyl-5-pyrazolone | ⅔ diethylene-triamine | red |
| 81 | 1 | 2-amino-4,6-dichloro- | 1-amino-2-naphthol-4- | 1 hexamethylene- | violet |

TABLE 6-continued

| I | II | | III | IV |
|---|---|---|---|---|
| Ex. No. | Sodium salt of the 1:2 chromium complex | | | Shade in |
| | Mol | X + Y | Mol Amine | PA 6 |
| | | phenol → 2-naphthol    sulphonic acid → 1-phenyl-3-methyl-5-pyrazolone | diamine | |

TABLE 7

| I | | II | III | | IV |
|---|---|---|---|---|---|
| Ex. No. | Mol | Sodium salt of the 1:2 chromium complex | Mol | Amine | Shade in PA 6 |
| 82 | 1 | 2-amino-4-phenylsulphonyl-phenol → 1-phenyl-3-methyl-5-pyrazolone | ½ | hexamethylene-diamine | orange |
| 83 | 1 | 2-amino-4-(4'-chlorophenylsulphonyl)-phenol → 1-phenyl-3-methyl-5-pyrazolone | ½ | hexamethylene-diamine | orange |
| 84 | 1 | 2-amino-4-(4'-methylphenylsulphonyl)-phenol → 1-phenyl-3-methyl-5-pyrazolone | ½ | hexamethylene-diamine | orange |
| 85 | 1 | 2-amino-4-chlorophenol → 2-naphthol | ½ | 1,12-diamino-dodecane | violet |
| 86 | 1 | 2-amino-4-chlorophenol → 2-naphthol | 1 | stearylamine | violet |
| 87 | 1 | 2-amino-4-chlorophenol → 2-naphthol | ½ | 4,13-diamino-2,15-dimethyl-hexadecane | violet |
| 88 | 1 | 2-aminophenol-4-sulphamide → 1-(3'-aminosulphonylphenyl)-3-methyl-5-pyrazolone | ½ | hexamethylene-diamine | orange |
| 89 | 1 | 2-aminophenol-4-sulphamide → 1-(3'-chlorophenyl)-3-methyl-5-pyrazolone | ½ | 1,12-diamino-dodecane | orange |
| 90 | 1 | 2-aminophenol-4-sulphamide → 1-(3'-chloro-phenyl)-3-methyl-5-pyrazolone | ½ | 4,13-diamino-2,15-dimethyl-hexadecane | orange |
| 91 | 1 | 2-aminophenol-4-sulphamide → 1-(3'-chloro phenyl)-3-methyl-5-pyrazolone | 1 | stearylamine | orange |

EXAMPLE 92

In the form of chips, 99 g of polyamide from ε-caprolactam (polyamide 6) is sprinkled dry with 1 g of the dye salt produced according to Example 1. The sprinkled chips are extruded at 290°–295° C. in an extruder. The resulting filament displays a level red dyeing having very good fastness to light, wet processing and thermofixing.

EXAMPLE 93

60 g of the dye produced according to Example 1 and 60 g of Mg behenate are processed in a kneader for one quarter of an hour at 120°–130° C. When the mixture is homogeneous, it is cooled and the cooled brittle product is ground to give a dye preparation containing 50% of dye salt.

A valuable dye preparation is likewise obtained by using 60 g of Mg stearate in place of 60 g of Mg behenate, following otherwise the same procedure as that described above.

EXAMPLE 94

In the form of chips, 98 g of polyamide from ε-caprolactam (polyamide 6) is sprinkled dry with 2 g of the dye preparation produced according to Example 83. The sprinkled chips are extruded at 290°–295° C. in an extruder. The filament thus obtained displays a level red dyeing which has very good fastness to light, wet processing and thermofixing.

We claim:

1. A process for dyeing linear polyamides in the melt in which the dyeing is effected by means of a dye salt of a 1:2 chromium complex of a monoazo dye and an amine, having the formula

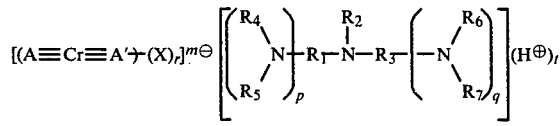

wherein

A, A' represents identical or different radicals of azo dyes, which radicals are bound to the Cr atom after 2 protons have been split off by the formation of 2 rings, X represents a —COO or —SO$_3$ group not bound to the Cr atom, R$_1$ represents an alkyl or alkylene group having 1-18 C atoms, a cycloalkyl or cycloalkylene group having 5-6 C atoms, or a phenyl or phenylene group, or said group substituted by halogen atoms or by alkyl group having 1-6 C atoms, R$_3$ represents an H atom, an alkyl or alkylene group having 1-18 C atoms, or a cycloalkyl group having 5-6 C atoms, R$_2$, R$_4$, R$_5$, R$_6$ and R$_7$ represent hydrogen, alkyl having 1 to 18 C atoms or cycloalkyl having 5 to 6 C atoms, m and t represent the numbers 1-3, r=m−1, p and q represent 0 or 1, where if R$_3$ represents a hydrogen atom, q=0; and t=p+q+1.

2. A process according to claim 1 wherein the dye salt has the formula

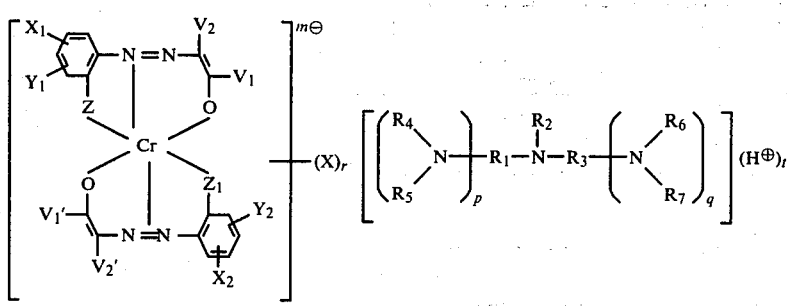

wherein
X, $R_1$, $R_2$, $R_3$, $R_4$, $R_5$, $R_6$, $R_7$, m, p, q, r and t are defined in claim 1, and $X_1$ and $X_2$ represent hydrogen, an alkyl, alkoxy or alkylsulphonyl group having 1-6 C atoms, an alkanoylamino group having 2-6 C atoms, or a group of the formula $SO_2NRR'$ in which R represents an H atom, an alkyl group having 1-6 C atoms, a hydroxyalkyl group having 2-6 C atoms, an alkoxyalkyl group having 3-8 C atoms, or a phenyl group, or said group substituted by halogen atoms or by alkyl groups having 1-4 C atoms, R' represents an H atom, an alkyl group having 1-6 C atoms, or a hydroxyalkyl group having 2-6 C atoms, $Y_1$ and $Y_2$ represent hydrogen, halogen, or alkyl having 1-6 C atoms, or wherein $X_1$ and $Y_1$ or
$X_2$ and $Y_2$ together form a fused-on benzene ring, Z and $Z_1$ represent an O atom or a —COO group, and the radical

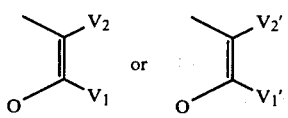

represents the group

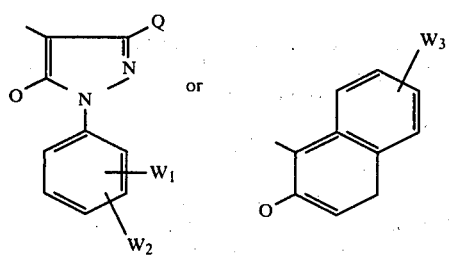

wherein
Q represents a methyl or carbamoyl group or an alkoxycarbonyl group having 2-6 C atoms,
$W_1$ represents an H or halogen atom, a methyl or sulphamoyl group,
$W_2$ represents an H or halogen atom, and
$W_3$ represents an H atom, or an alkanoylamino group having 2-6 C atoms.

3. A process according to claim 2 in which the dye salt is a symmetrical chromium complex amine salt wherein
$X_1 = X_2$, $Y_1 = Y_2$ and $Z = Z_1$, and the radicals

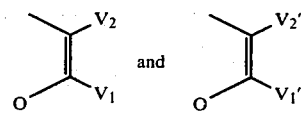

represent the radical of the formula

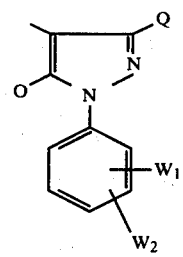

wherein Q, $W_1$ and $W_2$ are defined in claim 2.

4. A process according to claim 1 wherein the dye salt contains no free sulfonic acid groups or no free carboxyl groups.

5. A linear polyamide containing in the melt a dye salt according to claim 18.

6. A fiber made from a linear polyamide containing in the melt a dye salt according to claim 1.

7. A process for dyeing linear polyamides in the melt in which the dyeing is effected by means of a dye salt of a 1:2 chromium complex of a monoazo dye and an amine, having the formula

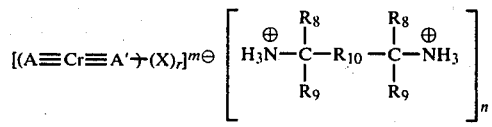

wherein
A, A' represent identical or different radicals of azo dyes, which radicals are bound to the Cr atom after 2 protons have been split off by the formation of 2 rings,
X represents a —COO or —$SO_3$ group not bound to the Cr atom,
$R_8$ represents a hydrogen atom, or an alkyl group having 1 to 4 C atoms,
$R_9$ represents the same as $R_8$, or a cyclopentyl, cyclohexyl or phenyl group, and
$R_{10}$ represents a straight-chain or branched-chain alkylene group having 1 to 18 C atoms,
m represents the number 1-3, $r = m - 1$, and $n = m/2$.

8. A process according to claim 7 wherein the dye salt has the formula

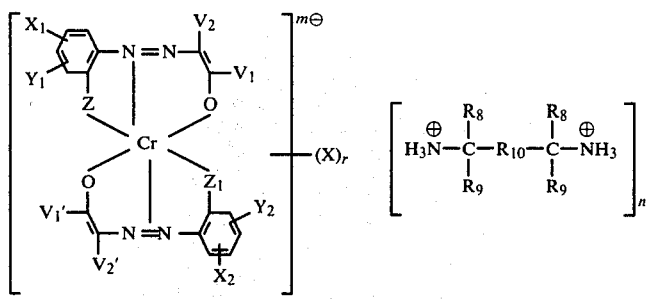

wherein
X, $R_8$, $R_9$, $R_{10}$, m, n and r are defined in claim 7, and $X_1$ and $X_2$ represent hydrogen, an alkyl, alkoxy or alkylsulphonyl group having 1-6 C atoms, an alkanoylamino group having 2-6 C atoms, or a group of the formula $SO_2NRR'$ in which R represents an H atom, an alkyl group having 1-6 C atoms, a hydroxyalkyl group having 2-6 C atoms, an alkoxyalkyl group having 3-8 C atoms, or a phenyl group, or said group substituted by halogen atoms or by alkyl groups having 1-4 C atoms, R' represents an H atom, an alkyl group having 1-6 C atoms, or a hydroxyalkyl group having 2-6 C atoms, $Y_1$ and $Y_2$ represent hydrogen, halogen or alkyl having 1-6 C atoms, or wherein $X_1$ and $Y_1$ or $X_2$ and $Y_2$ together form a fused-on benzene ring, Z and $Z_1$ represent an O atom or a —COO group, and the radical

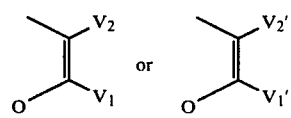

represents the group

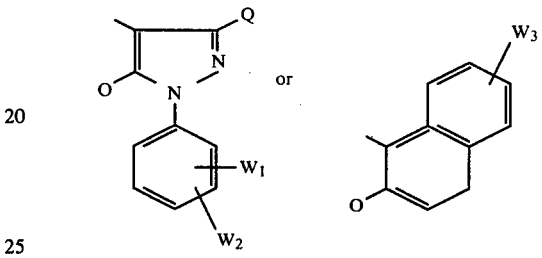

wherein

Q represents a methyl or carbamoyl group or an alkoxycarbonyl group having 2-6 C atoms, $W_1$ represents an H or halogen atom, a methyl or sulphamoyl group, $W_2$ represents an H or halogen atom, and $W_3$ represents an H atom, or an alkanoylamino group having 2-6 C atoms.

9. A process according to claim 8 in which the dye salt is a symmetrical chromium amine salt wherein $X_1=X_2$, $Y_1=Y_2$ and $Z=Z_1$, and the radicals

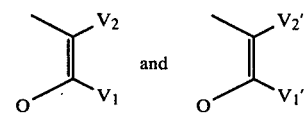

represent the radical of the formula

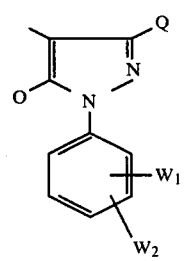

wherein Q, $W_1$ and $W_2$ are defined in claim 8.

10. A process according to claim 7 wherein the dye salt contains no free sulfonic acid groups or no free carboxyl groups.

11. A linear polyamide containing in the melt a dye salt according to claim 7.

12. A fiber made from a linear polyamide containing in the melt a dye salt according to claim 7.

* * * * *